United States Patent [19]

LaRosa

[11] Patent Number: 4,708,384
[45] Date of Patent: Nov. 24, 1987

[54] PROTECTIVE AUTOMOBILE PARTITION

[76] Inventor: Thomas LaRosa, 7 Farnam Pl., Albany, N.Y. 12205

[21] Appl. No.: 701,860

[22] Filed: Feb. 14, 1985

[51] Int. Cl.$^4$ .............................................. B60R 27/00
[52] U.S. Cl. .................................................. 296/24 R
[58] Field of Search ............ 296/24 R; 248/201, 287, 248/298, 300, 247; 403/403, 231

[56] References Cited

U.S. PATENT DOCUMENTS

| | | | |
|---|---|---|---|
| 2,570,731 | 10/1951 | Susnow | 248/247 |
| 2,733,952 | 2/1956 | Wright et al. | 296/24 R |
| 2,865,670 | 12/1958 | Dunn | 296/24 R |
| 2,997,331 | 9/1961 | Kudner | 296/24 R |
| 3,441,309 | 4/1969 | Halstead et al. | 296/24 R |
| 3,534,998 | 10/1970 | Johnson et al. | 296/24 R |
| 3,667,801 | 6/1972 | Setina | 296/24 R |
| 4,035,014 | 7/1977 | Sellers | 296/24 R |

Primary Examiner—David A. Scherbel
Assistant Examiner—Carol L. Olson
Attorney, Agent, or Firm—Schmeiser, Morelle & Watts

[57] ABSTRACT

In a protective automobile separator, a screen like divider to be installed between the front and rear seats. "L" shaped brackets secure the divider to the inner walls of the automobile. The "L" shaped brackets have centrally located longitudinal slots through which is bolted an adaptor bar which runs along side the divider. The longitudinal slots allow the adaptor bar to be placed at a predetermined location between the divider and the inner wall of the automobile in order to prevent a passenger from reaching around the separator.

4 Claims, 2 Drawing Figures

PROTECTIVE AUTOMOBILE PARTITION

FIELD OF THE INVENTION

This invention relates to protective type separators which are placed between the front and rear seats of automobiles. More specifically, this separator has adaptor bars for facilitating the installation of the separator into automobiles of varying sizes.

BACKGROUND OF THE INVENTION

The use of protective separators between the front and rear seats of special automobiles such as police vehicles is well known. Separators used in police vehicles must protect the police officers in the front seat from a variety of weapons which may not be found during a physical search of their passenger. Similarly, it is desirable for separators to allow a number of other functions, such as communication between the officers and the passenger, and a clear line of vision for the officers through the separator. Additionally, the separator should also be sufficiently safe for the passenger during his placement in and removal from the car.

It has heretofore been customary in producing separators to custom fit the separator to the specific model of automobiles into which it was being placed. This was mainly necessary in order to prevent the passenger from reaching around the separator and attacking the officers. However, due to the expense of resizing the separators to exactly fit the automobiles being supplied, certain standard sized separators have been used. These separators are used to fit a certain range of automobile sizes, but often the sizes are not sufficiently exact and an excess space is left around the separator, thereby creating a danger for the officers.

In addition, it has become common in recent years for police departments to move to smaller, more economical automobiles. These changes often require purchasing all new separators at a substantial expense. It is therefore an object of this invention to provide a protective automobile separator which can be fit into a variety of car sizes without allowing the passenger to have access to the occupants of the front seat.

Another object of this invention is to provide a protective separator which will not significantly obstruct the vision of the occupants in the front seat.

Another object of this invention is to provide a protective separator which is not likely to cause injury to a passenger while entering or exiting the automobile.

Another object of this invention is to provide a protective separator which allows communication between the occupants in the front and rear seats.

Another object of this invention is to provide a protective separator which is inexpensive to manufacture and easy to install.

Another object of this invention is to provide a protective separator which can be easily transferred from one automobile to another.

Objects and advantages of the invention are set forth in part herein and in part will be obvious herefrom, or may be learned by practice with the invention, the same being realized and attained by means of the instrumentalities and combinations pointed out in the appended claims.

This invention consists in the novel parts, constructions, arrangements, combinations and improvements herein shown and described.

SUMMARY OF THE INVENTION

It has been found that the objects of this invention may be realized by forming a protective separator with a central divider, having a metal screen type portion coated with rubber and framed by solid metal strips. Substantially "L" shaped brackets with longitudinal slots therein are used to secure the divider to the inner walls of the automobile. Adaptor bars are movably mounted to the brackets for placement at predetermined points along the longitudinal slots for placement between the slots of the divider and the inner walls of the automobile.

The protective separator of this invention results in a remarkable safe and versatile product. Since the adaptor bars can be adjusted along the brackets, the space which would normally exist between the divider and the inner wall of the automobile can be sufficiently closed off to stop the passenger from having access to the front seat from around the divider. The use of a metal screen type divider allows for a clear field of vision and the ability to communicate between the front and rear seats while the rubber coating of the divider helps assure that the passenger will not be injured should he come into contact with the divider.

It will be understood that the foregoing general description and the following detailed description as well are exemplary and explanatory of the invention, but are not restrictive thereof.

The accompanying drawings, referred to herein and constituting a part hereof, illustrate preferred embodiments of the invention and together with the description, serve to explain the principles of the invention.

DESCRIPTION OF THE PREFERRED EMBODIMENT

Figure 1:
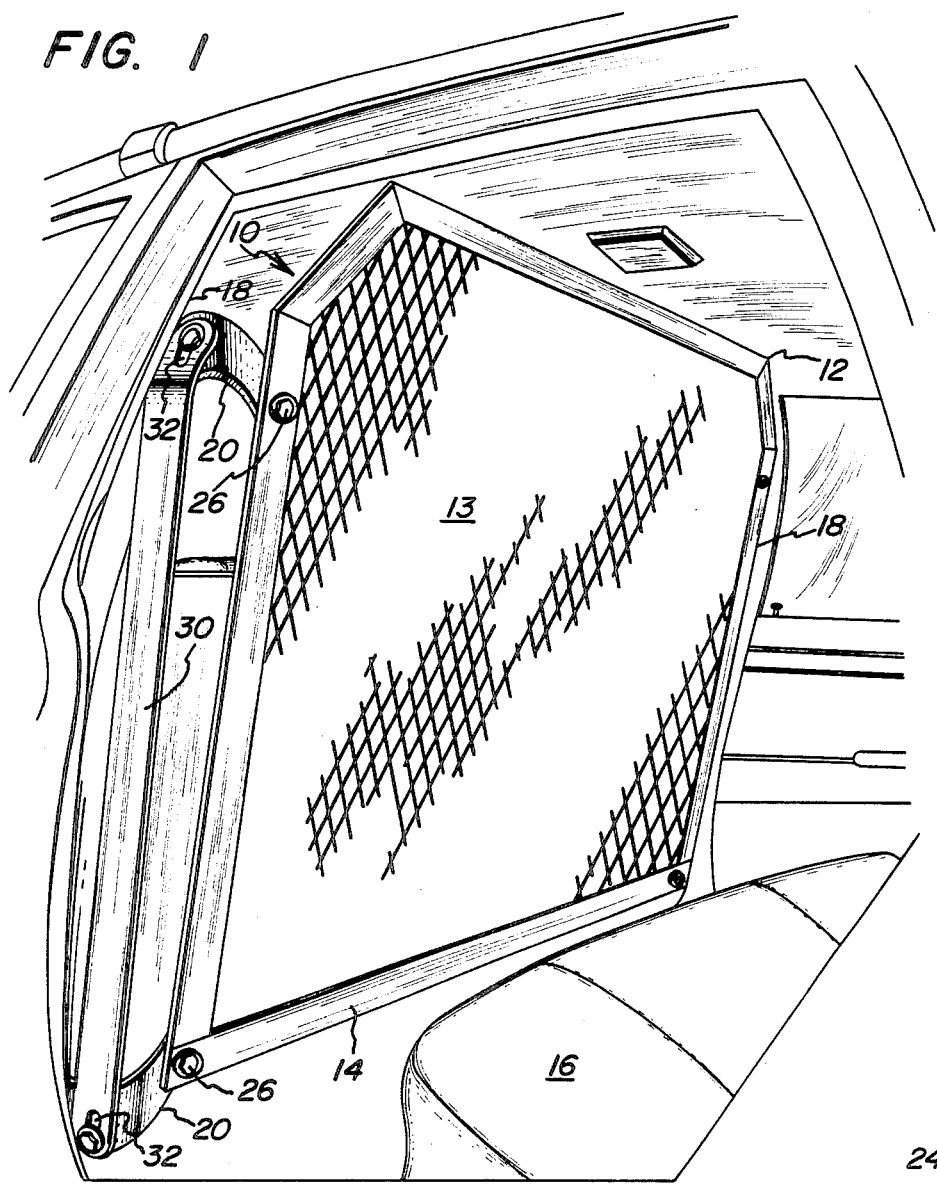
FIG. 1 is a perspective view of the divider installed in an automobile.

FIG. 1 shows the protective separator 10 in place within an automobile. The separator 10 has a divider 12 consisting of a screen 13 framed by metal strips 14. The metal strips 14 serve to protect the passenger from the ragged edges of the screen 13 while also serving to some degree as a roll bar for the automobile. In addition, the strips 14 serve to strengthen the separator and assure that the passenger seated on the back seat 16 cannot deform the separator in order to reach around it.

The divider is attached at either side to the inner wall 18 of the automobile. The attachment on either side is the same and, therefore, only one side is shown in the drawings. The divider is attached by means of a substantially "L" shaped bracket 20. Toward either end of the bracket 20 are apertures 22. One of the apertures is a first slot 24. Bolts 26 are inserted through the apertures 22 and serve to secure the divider 12 to the inner wall 18. The bracket 20 is arranged so that bolt 26 which connects the bracket to the divider enters through first slot 24. This allows the same bracket 20 to be used for various size automobiles since the divider may be bolted to the bracket at any point along first slot 24.

Figure 2:
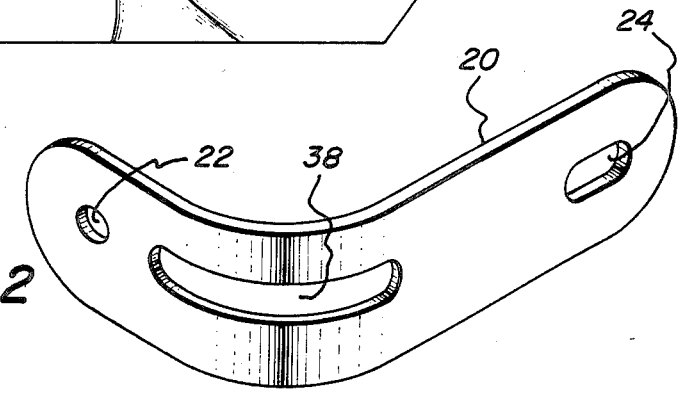
FIG. 2 is an enlargement of the bracket of this invention which secures the divider to the interior wall of the automobile.

As shown in FIG. 2, the bracket 20 also has a centrally located longitudinal slot 28. An adaptor bar 30

(see FIG. 1) is bolted to the bracket through the longitudinal slot 28. In my preferred embodiment, the adaptor bar is 3 inches wide and 32 inches long. By positioning the adaptor bar at a predetermined location along the longitudinal slot 28, the opening between the divider 12 and the inner wall 18 can be effectively closed, thereby preventing an occupant from reaching around the divider. It will be appreciated by those familiar with this art that such a problem is especially acute when the rear door is opened and access around the divider is more easily obtained.

In my preferred embodiment, the adaptor bar 30 has vertical slots 32 toward either end of the bar. It is through these slots that the bar is bolted to the brackets 20. The vertical slots 32 also allow the same size adaptor bar to be used in a variety of automobile sizes. It will also be appreciated that although in my preferred embodiment the adaptor bar is 32 inches long, a longer bar can be used so as to extend further up along side the divider 12.

In order to assure the safety of a passenger on the back seat 16, the screen 13 of divider 12 is preferably rubberized in order to cushion any impact on the screen.

In order to install the separator 10, one simply determines the portion of the inner wall of the automobiles to which the L shaped brackets 20 must be attached. After this determination is made, the brackets are attached to the inner wall 18 and then the divider 12 is attached to the other end of the bracket. Since the apertures in the end of the bracket to which the divider is attached are slotted, the connection can be easily made even where the width of the car is significantly smaller than a full size automobile. Once the divider 12 is in place, the distance between the divider and the inner wall 18 is measured. After measuring, the adaptor bar 30 is bolted to the brackets through the centrally located longitudinal slots 28 in a position that will effectively prevent access between the divider 12 and the inner wall 18. Should it become necessary to install the separator 10 into a different size automobile, the separator can simply be removed and installed as mentioned above with no cutting or major alterations.

The invention in its broader aspects is not limited to the specific embodiments herein shown and described but departures may be made therefrom within the scope of the accompanying claims, without departing from the principles of the invention and without sacrificing its chief advantages.

I claim:

1. A protective separator for placement in an automobile comprising:
   a divider adapted to be installed between the front and rear seats of the automobile;
   at least two "L" shaped brackets to secure each side of the divider to the inner walls of the automobile, brackets on the same side being adapted to secure the top and bottom portions of the divider to the car wall, said brackets having a gradually curved central portion forming the corner of the "L", and substantially centrally located longitudinal slots throughout said curved portion and at least one longitudinal slot located near the end of each bracket, said centrally located slots and said end slots affording secureable adjustability of said separator without removal of securing bolts normally placed therethrough; and
   an adaptor bar secured to the top and bottom bracket on each side of the divider and spanning the space therebetween, each bar possesssing at least two vertical slots by which said bars are secured to said brackets at a predetermined position along the substantially centrally located longitudinal slots in the brackets to allow vertical movement of said bars to said predetermined position, said bars secured in a spaced apart relationship from the automobile wall and the divider, the positioning of the bar along said curved portion effecting an articulation of the bar to the most advantageous position for substantially limiting access around the divider.

2. The invention of claim 1 wherein the adaptor bars are substantially 3 inches in width and substantially 32 inches long.

3. The invention of claim 2 wherein the divider is a screen framed by metal strips.

4. The invention of claim 3 wherein the screen portion of the divider is rubber coated.

* * * * *